US008440142B2

(12) United States Patent
Yan et al.

(10) Patent No.: US 8,440,142 B2
(45) Date of Patent: May 14, 2013

(54) DUAL-MODE PLASMA REACTOR

(75) Inventors: Jyh-Ming Yan, Taoyuan County (TW); Yung-Chih Chen, Taoyuan County (TW); Shiaw-Huei Chen, Taoyuan County (TW); Ming-Song Yang, Taoyuan County (TW); Men-Han Huang, Taoyuan County (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 0 days.

(21) Appl. No.: 12/076,252

(22) Filed: Mar. 14, 2008

(65) Prior Publication Data

US 2011/0020189 A1 Jan. 27, 2011

(51) Int. Cl.
*B01J 19/08* (2006.01)

(52) U.S. Cl.
USPC ........ 422/186; 240/156; 240/164; 118/723 E; 219/121.11

(58) Field of Classification Search ... 422/186; 204/156, 204/164; 118/723 E; 219/121.11
See application file for complete search history.

(56) References Cited

U.S. PATENT DOCUMENTS

| | | | | |
|---|---|---|---|---|
| 3,641,308 | A * | 2/1972 | Couch et al. | 219/121.5 |
| 6,156,995 | A * | 12/2000 | Severance, Jr. | 219/121.5 |
| 2003/0101936 | A1* | 6/2003 | Lee | 118/723 E |
| 2005/0214179 | A1* | 9/2005 | Rabinovich et al. | 422/186 |
| 2006/0289407 | A1* | 12/2006 | Cook et al. | 219/121.52 |
| 2008/0041312 | A1* | 2/2008 | Matsuyama et al. | 118/728 |

* cited by examiner

*Primary Examiner* — Xiuyu Tai
(74) *Attorney, Agent, or Firm* — Jackson IPG PLLC

(57) ABSTRACT

A dual-mode non-thermal plasma reactor includes an air-buffering chamber, a magnetic element provided on the air-buffering chamber, a first electrode disposed in the air-buffering chamber, a second electrode disposed in the air-buffering chamber opposite to the first electrode, a high-voltage power supply connected to the first and second electrodes and an air-swirling chamber located between the first and second electrodes. The air-swirling chamber includes a first isolating film covering on an internal side of the first electrode, a second isolating film covering on an internal side of the second electrode and an isolating tube placed between the first and second isolating films. An air passageway is defined through the first and second isolating films. An air-swirling space is defined by the first and second isolating films and the isolating tube. The isolating tube includes at least one tunnel in communication with the air-swirling space.

16 Claims, 3 Drawing Sheets

| Flow Rate(LPM) | I (mA) | V (kV) | $O_3$(ppm) | $NO_x$(ppm) |
|---|---|---|---|---|
| 100 | 10 | 30 | 34.6 | 0 |
| 100 | 30 | 28 | 0 | 867 |
| 150 | 10 | 30 | 22.5 | 0 |
| 150 | 31 | 29 | 0 | 565 |
| 200 | 10 | 30 | 15.1 | 0 |
| 200 | 27 | 33 | 0 | 422 |

Fig. 3

DUAL-MODE PLASMA REACTOR

FIELD OF THE INVENTION

The present invention relates to a plasma reactor and, more particularly, to a two-mode plasma reactor for cleaning objects effectively, efficiently and economically.

DESCRIPTION OF THE RELATED ARTS

Traditionally, objects are cleaned with cleaning agent and water, and then dried. For the use of the cleaning agent, there is produced volatile organic vapor that causes air pollution. Because of the use of the water, there is produced waste water that causes water pollution. Moreover, much time is spent. The Environment Protection Agent of Taiwan is amending air regulations for fee of VOC pollution to encourage manufacturers to come up with new and clean processes. In fact, it is a global trend to make similar regulations to encourage manufacturers to use new and clean processes.

Non-thermal plasma-based cleaning processes are qualified as effective processes for cleaning objects. In a non-thermal plasma-based cleaning process, high-voltage discharge is used to release highly energetic electrons from a certain gas. The highly energetic electrons hit another gas to produce excited molecules and free radicals. The excited molecules and free radicals react with organic contaminants on objects and convert the organic contaminants into harmless or less pollutant substances. Thus, the objects are cleaned. Oxidation reaction may occur. Energy is targeted on the electrons, not the molecules of the gas. Therefore, the average temperature of the electrons is much higher than that of the gas. This is the reason why it is called "non-thermal plasma-based cleaning process". The non-thermal plasma-based clean process is efficient, wasteless, and energy-saving.

The design of a plasma-reactor is closely related to its purpose. Plasma reactors are based on radio frequency discharge ("RFD") or dielectric barrier discharge ("DBD"). The RFD is generally executed via a metal vibrating chamber. Since it is difficult to initiate the discharge in the atmosphere, an RFD plasma reactor must be supplemented by a modulating device to use loading match to reduce reflection. Hence, the RFD plasma is a complicated structure with high cost.

The DBD was first devised by Siemens to produce ozone in 1857, and has not been changed considerably since then. A DBD plasma reactor includes a dielectric barrier or two between two electrodes, thus avoiding short circuit. The DBD plasma reactor requires a common high-voltage power supply with low cost.

A plasma reactor is disclosed in Taiwanese Patent Publication No. 541614. The plasma reactor includes a chamber and a frame disposed in it. The frame includes grooves for receiving objects to be cleaned. A voltage is generated between the electrodes by a power supply. A magnetic field is generated by a magnet located outside the electrodes. Thus, plasma is generated to clean the objects. An axle is disposed in the frame. A motor for the chamber drives the axle up and down to push the objects out of the frame one after another. Thus, the frame does not interfere with the cleaning process. This plasma reactor is however structurally complicated. In use, a batch of objects is disposed in the plasma reactor. It takes much time to complete the washing of the batch. The washed batch is replaced with another batch. The replacement takes much time. The number of the objects in a batch is small. To clean many objects, much time is wasted on the replacement. Moreover, it would waste much energy if the plasma reactor is turned on during the replacement. On the other hand, it would take much time in turning on the plasma reactor again if the plasma reactor is turned off during the replacement.

The present invention is therefore intended to obviate or at least alleviate the problems encountered in prior art.

SUMMARY OF THE INVENTION

The primary objective of the present invention is to build a dual-mode non-thermal plasma reactor.

According to the present invention, the dual-mode non-thermal plasma reactor includes an air-buffering chamber, a magnetic element provided on the air-buffering chamber, a first electrode disposed in the air-buffering chamber, a second electrode disposed in the air-buffering chamber opposite to the fist electrode, a high-voltage power supply connected to the first and second electrodes, and an air-swirling chamber located between the first and second electrodes. The air-swirling chamber includes a first isolating film covering on an internal side of the first electrode, a second isolating film covering on an internal side of the second electrode, and an isolating tube placed between the first and second isolating films. An air passageway is defined through the first and second isolating films. An air-swirling space is defined by the first and second isolating films and the isolating tube. The isolating tube includes at least one tunnel in communication with the air-swirling space.

Other objectives, advantages and features of the present invention will become apparent from the following description referring to the attached drawings.

BRIEF DESCRIPTION OF THE DRAWINGS

The present invention will be described via the detailed illustration of the preferred embodiment referring to the drawings.

FIG. 3 is a table of data collected about a cleaning process executed by the plasma reactor shown in FIG. 1.

DETAILED DESCRIPTION OF EMBODIMENT

Figure 1:
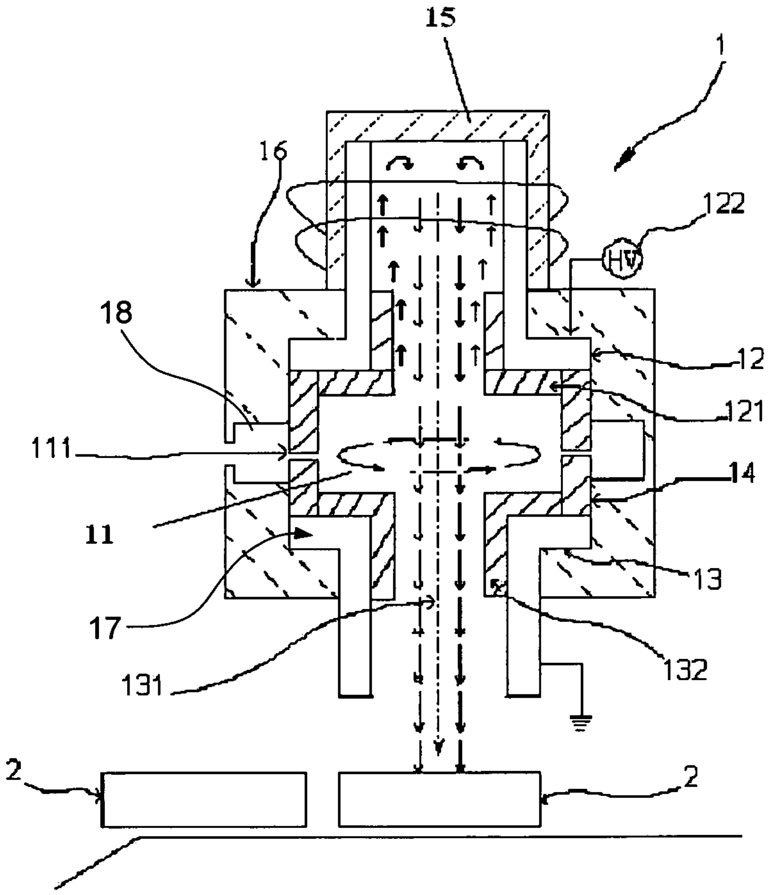
FIG. 1 is a cross-sectional view of a dual-mode non-thermal plasma reactor according to the preferred embodiment of the present invention.
Figure 2:
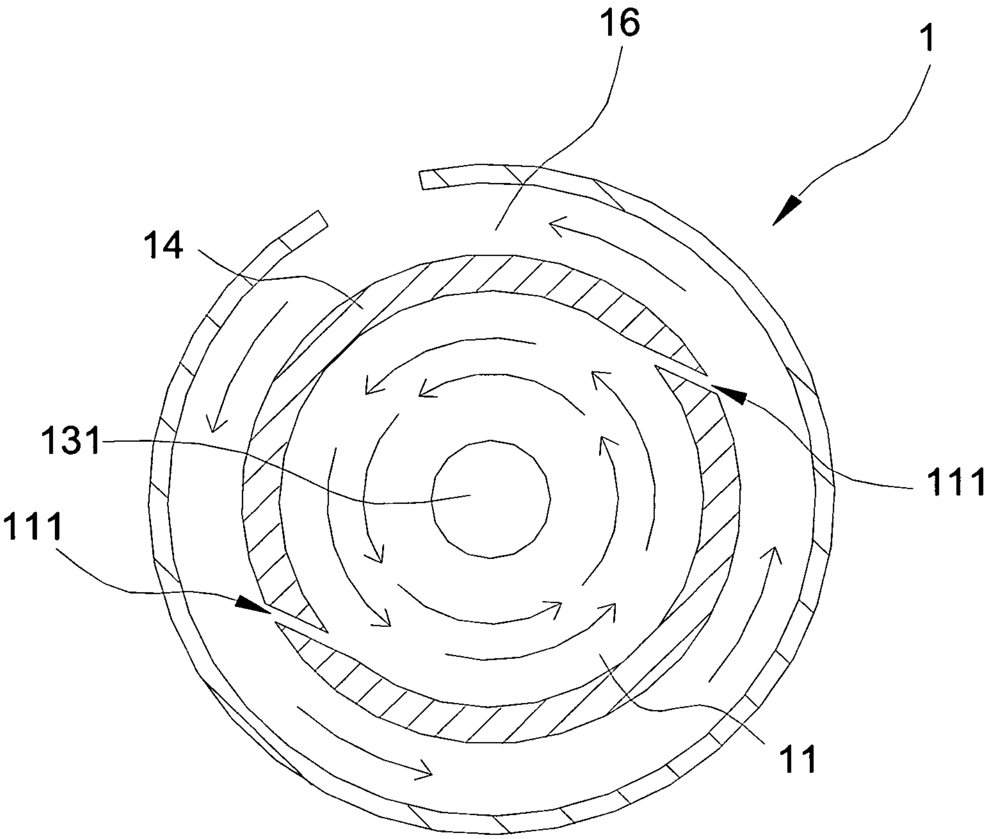
FIG. 2 is another cross-sectional view of the dual-mode non-thermal plasma reactor shown in FIG. 1.

Referring to FIGS. 1 and 2, a dual-mode non-thermal plasma reactor 1 includes an air-buffering chamber 16, a first electrode 12 disposed in the air-buffering chamber 16, a second electrode 13 disposed in the air-buffering chamber 16 opposite to the fist electrode, an air-swirling chamber 17 located between the electrodes 12 and 13 and a magnetic element 15 provided on the air-buffering chamber 16 according to the preferred embodiment of the present invention. The second electrode 13 is grounded.

The air-buffering chamber 16 includes an air-buffering space 18 defined therein, upper and lower openings both in communication with the air-buffering space 18 and a peripheral aperture 111 in communication with the air-buffering space 18. The air-buffering chamber 16 is made an isolating material such as poly tetra fluoride and polyetheretherketone.

The magnetic element 15 is shaped like a cap to close the upper opening of the air-buffering chamber 16. The magnetic element 15 may be a permanent magnet or a solenoid.

The electrodes 12 and 13 may be made of a magnetically non-conductive material such as copper alloy. The thickness of the electrodes 12 and 13 is 3 to 5 mm.

A high-voltage power supply 122 is provided between the electrodes 12 and 13, thus providing a high voltage between the electrodes 12 and 13 for discharging. The high-voltage power supply 122 may be a high-frequency (>1 kHz) alternating current power supply.

The air-swirling chamber 17 consists of an insolating film 121 coated on an internal side of the first electrode 12, an isolating film 132 coated on an internal side of the second electrode 13 and an isolating tube 14 provided between the electrodes 12 and 13. An air-swirling space 11 and an air passageway 131 are defined in the air-swirling chamber 17.

The isolating films 121 and 132 may be made of poly tetra fluoride, polyetheretherketone, polyethylene, ceramic, glass or quartz. Each of the isolating films 121 and 132 includes a tubular portion and an annular portion around the tubular portion. The tubular portion of the first isolating film 121 is inserted into the magnetic element 15 through the upper opening of the air-buffering chamber 16. The tubular portion of the second isolating film 132 is inserted through the lower opening of the air-buffering chamber 16. The thickness of the isolating films 121 and 132 is 0.5 to 3 mm. The internal diameter of the tubular portions of the isolating films 121 and 132 is 0.5 to 1.5 cm. The tubular portion of the isolating films 132 however includes a reduced tip with an internal diameter of 0.3 to 0.8 cm. The distance between the annular portions of the isolating films 121 and 132 is 0.3 to 1 cm.

The isolating tube 14 includes at least one tunnel 111 in communication with the air-swirling space 11. There are preferably a plurality of tunnels 111. The diameter of the tunnels 111 is 1 mm. The tunnels 111 extend along tangential directions relative to the air-swirling space 11.

Working gas goes into the air-buffering space 18 from the exterior of the air-buffering chamber 16 through the peripheral aperture of the air-buffering chamber 16. The working gas goes into the air-swirling space 11 from the air-buffering space 18 through the tunnels 111. The working gas swirls in the air-swirling space 11.

In a first mode, the high-voltage power supply 122 provides a current between the electrodes 12 and 13. Discharge occurs mainly in the air-swirling space 11, and this discharge is called "streamer."

In a second mode, the high-voltage power supply 122 provides a stronger current between the electrodes 12 and 13. Discharge occurs mainly in the air passageway 131, and this discharge is called "spark."

Because of the streamer or spark, plasma is produced from the working gas. The plasma leaves the air passageway 131. The plasma cleans objects 2 conveyed by a conveyor belt for example. The objects 2 are conveyed on the conveyor belt and cleaned by the plasma continuously. There is no need to interrupt the operation of the dual-mode non-thermal plasma reactor 1. The magnetic element 15 provides a magnetic field for directing the plasma downwards.

Referring to Table 1, some data are collected from the operation of the dual-mode non-thermal plasma reactor 1. In the operation, the working gas is air. The operation is executed in the atmosphere. In the first mode, the streamer converts the air into ozone. In the second mode, the spark converts the air into nitrogen oxide instead of ozone.

As discussed above, based on the types of contaminants to be removed from the objects, the power of the high-voltage power supply 122 can be changed so that the dual-mode non-thermal plasma reactor 1 is operated in the first or second mode. Therefore, the operation is effective. The conveyor belt moves the objects 2 under the air passageway 131 to be cleaned one after another. Therefore, the operation is continuous, efficient and economic.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A dual-mode non-thermal plasma reactor comprising:

an air-buffering chamber comprising:

an air-buffering space defined therein;

upper and lower openings both in communication with the air-buffering space; and a peripheral aperture in communication with the air-buffering space;

a magnetic element provided on the air-buffering chamber and configured to close an upper opening of the air-buffering chamber;

a first electrode disposed in the air-buffering chamber;

a second electrode disposed in the air-buffering chamber opposite to the first electrode;

a high-voltage power supply providing a high voltage between the first and second electrodes wherein the high-voltage power supply provides a first current between the first and second electrodes to provide streamer discharge in an air-swirling space in a first mode and provides a stronger second current between the first and second electrodes to provide spark discharge in an air passageway in a second mode so as to discharge two modes of a non-thermal plasma; and wherein an air-swirling chamber is located between the first and second electrodes, the air-swirling chamber comprising:

a first isolating film covering on an internal side of the first electrode and wherein the first isolating film includes a respective tubular portion and a respective annular portion around the respective tubular portion and wherein the tubular portion of the first isolating film is inserted into the magnetic element through the upper opening of the air-buffering chamber;

a second isolating film covering on an internal side of the second electrode wherein the second isolating film includes a respective tubular portion and a respective annular portion around the respective tubular portion and so that the air passageway is defined through the first and second isolating films; and an isolating tube placed between the first and second isolating films so that the air-swirling space and the air passageway are defined by the first and second isolating films and the isolating tube, the isolating tube comprising at least one tunnel in communication with the air-swirling space.

2. The dual-mode non-thermal plasma according to claim 1, wherein the isolating tube comprises a plurality of tunnels.

3. The dual-mode non-thermal plasma according to claim 2, wherein the tunnels are evenly located around the isolating tube and extend along tangential directions relative to the air-swirling space so that working gas goes into the air-swirling space through the tunnels and swirls in the air-swirling space.

4. The dual-mode non-thermal plasma according to claim 1, wherein the diameter of the at least one tunnel is 1 mm.

5. The dual-mode non-thermal plasma according to claim 1, wherein the thickness of the first and second electrodes is 3 to 5 mm.

6. The dual-mode non-thermal plasma according to claim 1, wherein the first and second electrodes are made of a magnetically non-conductive material.

7. The dual-mode non-thermal plasma according to claim 6, wherein the magnetically non-conductive material is copper alloy.

8. The dual-mode non-thermal plasma according to claim 1, wherein the first and second isolating films are made of a material selected from a group consisting of poly tetra fluoride, polyetheretherketone, polyethylene, ceramic, glass and quartz.

9. The dual-mode non-thermal plasma according to claim 1, wherein the thickness of the first and second isolating films is 0.5 to 3 mm.

10. The dual-mode non-thermal plasma according to claim 1, wherein the distance between the first and second isolating films is 0.3 to 1 cm.

11. The dual-mode non-thermal plasma according to claim 1, wherein the diameter of the air passageway is 0.5 to 1.5 cm.

12. The dual-mode non-thermal plasma according to claim 1, wherein the magnetic element is selected from a group consisting of a permanent magnet and a solenoid.

13. The dual-mode non-thermal plasma according to claim 1, wherein the air-buffering chamber is made of a material selected from a group consisting of poly tetra fluoride and polyetheretherketone.

14. The dual-mode non-thermal plasma according to claim 1, wherein the high-voltage power supply is a high-frequency alternating current power supply.

15. The dual-mode non-thermal plasma according to claim 14, wherein the operative frequency of the high-voltage power supply is higher than 1 kHz.

16. The dual-mode non-thermal plasma of claim 1, wherein the tubular portion of the second isolating film is inserted through a lower opening of the air-buffering chamber.

* * * * *